United States Patent
Kojima et al.

(10) Patent No.: US 10,655,885 B2
(45) Date of Patent: May 19, 2020

(54) INDOOR UNIT OF AIR-CONDITIONING DEVICE

(71) Applicant: DAIKIN INDUSTRIES, LTD., Osaka-shi, Osaka (JP)

(72) Inventors: Nobuyuki Kojima, Osaka (JP); Akira Komatsu, Osaka (JP); Ryouta Suhara, Osaka (JP); Masaaki Murata, Osaka (JP); Natsumi Furo, Osaka (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/758,438

(22) PCT Filed: Aug. 26, 2016

(86) PCT No.: PCT/JP2016/003898
§ 371 (c)(1),
(2) Date: Mar. 8, 2018

(87) PCT Pub. No.: WO2017/056386
PCT Pub. Date: Apr. 6, 2017

(65) Prior Publication Data
US 2018/0252429 A1   Sep. 6, 2018

(30) Foreign Application Priority Data

Sep. 29, 2015 (JP) .................. 2015-191716

(51) Int. Cl.
*F24F 11/79* (2018.01)
*F24F 1/00* (2019.01)
(Continued)

(52) U.S. Cl.
CPC ............ *F24F 11/79* (2018.01); *F24F 1/0014* (2013.01); *F24F 1/0047* (2019.02); *F24F 11/77* (2018.01);
(Continued)

(58) Field of Classification Search
CPC ....... F24F 11/79; F24F 1/0014; F24F 2140/50
See application file for complete search history.

(56) References Cited

U.S. PATENT DOCUMENTS 6,857,577 B2 * 2/2005 Hunka ..................... F24F 11/76
236/49.5
7,185,504 B2 * 3/2007 Kasai .................... F24F 1/0007
62/186
(Continued)

FOREIGN PATENT DOCUMENTS

CN   103477155 A   12/2013
CN   107076447 A   8/2017
(Continued)

OTHER PUBLICATIONS

International Search Report (PCT/ISA/210) issued in PCT/JP2016/003898, dated Sep. 27, 2016.
(Continued)

*Primary Examiner* — Edelmira Bosques
*Assistant Examiner* — Phillip Decker
(74) *Attorney, Agent, or Firm* — Birch, Stewart, Kolasch & Birch, LLP.

(57) ABSTRACT

Entrance of cold air from near a wall of an indoor space is avoided. An airflow direction adjusting flap is provided at a main outlet opening, and changes the direction of airflow coming from the main outlet opening in a vertical direction. A load detector detects a load of an indoor space. When the load of the indoor space is higher than a predetermined value in a heating operation, the airflow direction adjusting flap guides the air coming from the main outlet opening in a horizontal direction or in an upward direction with respect to the horizontal direction.

2 Claims, 9 Drawing Sheets

(51) Int. Cl.
    *F24F 11/89*     (2018.01)
    *F24F 1/0047*    (2019.01)
    *F24F 11/77*     (2018.01)
    *F24F 1/0014*    (2019.01)
    *F24F 110/10*    (2018.01)
    *F24F 140/50*    (2018.01)

(52) U.S. Cl.
    CPC ........... *F24F 11/89* (2018.01); *F24F 2110/10* (2018.01); *F24F 2140/50* (2018.01)

(56) References Cited

U.S. PATENT DOCUMENTS

| | | | | |
|---|---|---|---|---|
| 9,863,661 | B2* | 1/2018 | Iwano | F24F 13/20 |
| 10,274,220 | B2* | 4/2019 | Kojima | F24F 11/77 |
| 10,422,546 | B2* | 9/2019 | Suhara | F24F 11/79 |
| 2012/0097748 | A1* | 4/2012 | Kanaya | F24F 1/0014 |
| | | | | 236/49.3 |
| 2012/0174608 | A1* | 7/2012 | Kumamoto | F24F 1/0011 |
| | | | | 62/186 |
| 2012/0225618 | A1* | 9/2012 | Nouchi | F24F 1/0011 |
| | | | | 454/258 |
| 2015/0096723 | A1* | 4/2015 | Jeong | F24F 13/1426 |
| | | | | 165/121 |
| 2016/0201936 | A1* | 7/2016 | Suhara | F24F 3/044 |
| | | | | 165/212 |
| 2017/0276392 | A1* | 9/2017 | Komatsu | F24F 11/89 |
| 2017/0292732 | A1* | 10/2017 | Kojima | F24F 11/89 |
| 2018/0259217 | A1* | 9/2018 | Kojima | F24F 11/77 |
| 2018/0299164 | A1* | 10/2018 | Suhara | F24F 11/79 |
| 2019/0056137 | A1* | 2/2019 | Komatsu | F24F 11/72 |
| 2019/0113250 | A1* | 4/2019 | Tsutsumi | F24F 1/0007 |

FOREIGN PATENT DOCUMENTS

| | | | | |
|---|---|---|---|---|
| EP | 2918929 A1 * | 9/2015 | ........... | F24F 1/0011 |
| JP | 1-302059 A | 12/1989 | | |
| JP | 6-50595 A | 2/1994 | | |
| JP | 10-103739 A | 4/1998 | | |
| JP | 11-63627 A * | 3/1999 | | |
| JP | 11-248230 A | 9/1999 | | |
| JP | 2005-24154 A | 1/2005 | | |
| JP | 2011-69594 A | 4/2011 | | |
| JP | 2011-112259 A | 6/2011 | | |
| JP | 2012-184868 A | 9/2012 | | |
| JP | 2014-55734 A | 3/2014 | | |
| JP | 2014055733 A * | 3/2014 | | |
| WO | WO 2013/084426 A1 | 6/2013 | | |

OTHER PUBLICATIONS

Extended European Search Report dated Apr. 11, 2019 in corresponding European Application No. 16850569.1.

* cited by examiner (a) USUAL AIRFLOW OPERATION (FIRST TIME)

(b) FIRST AIRFLOW OPERATION (d) SECOND AIRFLOW OPERATION (c) USUAL AIRFLOW OPERATION (SECOND TIME)

(a) KNOWN INDOOR UNIT (b) EMBODIMENT OF PRESENT INVENTION

INDOOR UNIT OF AIR-CONDITIONING DEVICE

TECHNICAL FIELD

The present invention relates to an indoor unit of an air-conditioning device which controls condition of indoor air.

BACKGROUND ART

Indoor units of air-conditioning devices, such as those disclosed in Patent Document 1, have been known. An indoor unit of this type is installed near the ceiling and blows heated or cooled air into an indoor space.

CITATION LIST

Patent Document

Patent Document 1: Japanese Unexamined Patent Publication No. H1-302059

SUMMARY OF THE INVENTION

Technical Problem

Patent Document 1 discloses adjusting the airflow direction such that warm air is directed downward when a load is high during a heating operation (e.g. when there is a great difference between the outside-air temperature and the room temperature). In this case, the air right under the indoor unit may be heated, but cold air enters the indoor space from near the walls. If this occurs, the great difference in temperature between, for example, a central area and a wall area (a peripheral area) of the indoor space may be maintained.

In view of the foregoing, it is therefore an object of the present invention to avoid entrance of cold air from near a wall of an indoor space.

Solution to the Problem

A first aspect of the present disclosure is directed to an indoor unit of an air-conditioning device which supplies air to an indoor space (500). The indoor unit includes: an indoor casing (20) provided with outlet openings (24a to 24d); an airflow direction adjusting flap (51) which is provided at each of the outlet openings (24a to 24d) and changes a direction of air coming from the outlet openings (24a to 24d) in a vertical direction; a load detector (91) which detects a load of the indoor space (500); and a controller (92) which controls the airflow direction adjusting flap (51) when the load of the indoor space (500) is higher than a predetermined value in a heating operation, such that the direction of the air coming from the outlet opening (24a to 24d) is a horizontal direction or directed upward from the horizontal direction.

In this configuration, when the load of the indoor space (500) is higher than the predetermined value in the heating operation, air is supplied to the indoor space (500) in the horizontal direction or in an upward direction with respect to the horizontal direction. Relatively warm air therefore reaches the vicinity of the wall of the indoor space (500) from where cold air is likely to enter the indoor space (500). The relatively warm air blocks the cold air from coming into the indoor space (500) from near the wall. Entrance of cold air into the indoor space (500) from near the wall can be avoided in this manner. Consequently, the difference in temperature between a central portion and a peripheral portion (near the wall) of the indoor space (500) becomes small.

A second aspect of the present disclosure is an embodiment of the first aspect. In the second aspect, the indoor casing (20) is further provided with an inlet opening (23). The indoor unit further includes a temperature detector (81) which detects a suction temperature of air sucked into the indoor casing (20) from the inlet opening (23). When the load of the indoor space (500) is higher than the predetermined value in the heating operation is when a difference between a set temperature in the heating operation and the suction temperature is greater than a predetermined difference.

In this configuration, the load of the indoor space (500) in the heating operation is determined by a simple method as described above.

A third aspect of the present disclosure is an embodiment of the first or second aspect. In the third aspect, when the load of the indoor space (500) is higher than the predetermined value in the heating operation, the controller (92) sets a speed of the air coming from each of the outlet openings (24a to 24d) at a higher speed than when the load of the indoor space (500) is lower than the predetermined value in the heating operation.

Thus, the relatively warm air can reach the vicinity of the wall more easily. Entrance of cold air into the indoor space (500) from near the wall can be avoided more reliably.

A fourth aspect of the present disclosure is an embodiment of the third aspect. In the fourth aspect, the indoor casing (20) is provided with at least one of the outlet openings (24a to 24d). The indoor unit is provided with an airflow inhibition mechanism (50) which corresponds to the outlet opening (24a to 24d) and is configured to inhibit flow of air. When the load of the indoor space (500) is higher than the predetermined value in the heating operation, the controller (92) controls the airflow inhibition mechanism (50) such that a total opening area of the at least one outlet opening (24a to 24d) is smaller than when the load of the indoor space (500) is lower than the predetermined value in the heating operation.

In this configuration, when the load of the indoor space (500) is higher than the predetermined value in the heating operation, the speed of air is increased by reducing the total opening area of the outlet openings (24a to 24d).

A fifth aspect of the present disclosure is an embodiment of the fourth aspect. In the fifth aspect, the airflow direction adjusting flap (51) is configured to be movable to a position where the flow of air is inhibited, and serves also as the airflow inhibition mechanism (50).

This configuration allows the air to be supplied at a higher speed by reducing the total opening area of the outlet openings (24a to 24d) without any other airflow inhibition mechanism (50) provided independently of the airflow direction adjusting flap (51).

A sixth aspect of the present disclosure is an embodiment of any one of the third to fifth aspects. In the sixth aspect, an indoor fan (31) which is disposed in the indoor casing (20) and generates flow of the air coming from the outlet opening (24a to 24d). When the load of the indoor space (500) is higher than the predetermined value in the heating operation, the controller (92) sets a rotational speed of the indoor fan (31) at a higher speed than when the load of the indoor space (500) is lower than the predetermined value in the heating operation.

In this configuration, air can be easily supplied at a higher speed.

A seventh aspect of the present disclosure is directed to an indoor unit of an air-conditioning device which supplies air to an indoor space (500). The indoor unit includes: an indoor casing (20) provided with outlet openings (24a to 24d); an airflow direction adjusting flap (51) which is provided at each of the outlet openings (24a to 24d) and changes a direction of air coming from the outlet openings (24a to 24d) in a vertical direction; a receiver (201) which can receive an instruction from a user to select a horizontal airflow mode in which air is supplied in a horizontal direction or an upward direction with respect to the horizontal direction, and a controller (92) which controls the airflow direction adjusting flap (51) when the receiver (201) receives the horizontal airflow mode in a heating operation, such that the direction of the air coming from the outlet opening (24a to 24d) is a horizontal direction or directed upward from the horizontal direction.

In this configuration, when the receiver (201) receives the horizontal airflow mode in the heating operation, air is supplied to the indoor space (500) in the horizontal direction or in the upward direction with respect to the horizontal direction. That is, the horizontal airflow mode is selected by a person in the room when the person himself/herself feels that the indoor space (500) is in the so-called high load state. The relatively warm air can therefore reach the vicinity of the wall of the indoor space (500) from where cold air is likely to enter the indoor space (500). The relatively warm air blocks the cold air from coming into the indoor space (500) from near the wall. Entrance of cold air into the indoor space (500) from near the wall can be avoided in this manner. Consequently, the difference in temperature between a central portion and a peripheral portion (near the wall) of the indoor space (500) becomes small.

An eighth aspect of the present disclosure is an embodiment of the seventh aspect. In the eighth aspect, when the receiver (201) receives the horizontal airflow mode, the controller (92) sets a speed of air coming from each of the outlet openings (24a to 24d) at a higher speed than when the receiver (201) does not receive the horizontal airflow mode.

Thus, the relatively warm air can reach the vicinity of the wall more easily. Entrance of cold air into the indoor space (500) from near the wall can be avoided more reliably.

Advantages

According to the aspects of the present disclosure and the seventh aspect described above, entrance of cold air into the indoor space (500) from near the wall can be avoided. Consequently, the difference in temperature between a central portion and a peripheral portion (near the wall) of the indoor space (500) becomes small.

According to the second aspect, the load of the indoor space (500) in the heating operation is determined by a simple method.

According to the third and eighth aspects, entrance of cold air into the indoor space (500) from near the wall can be avoided more reliably.

According to the fourth aspect, the speed of air is increased by reducing the total opening area of the outlet openings (24a to 24d).

According to the fifth aspect, the air can be supplied at a higher speed by reducing the total opening area of the outlet openings (24a to 24d) without any other airflow inhibition mechanism (50) provided independently of the airflow direction adjusting flap (51).

According to the sixth aspect, air can be easily supplied at a higher speed.

DESCRIPTION OF EMBODIMENT

Embodiments of the present invention will now be described in detail with reference to the drawings. The embodiments below are merely exemplary ones in nature, and are not intended to limit the scope, applications, or use of the invention.

First Embodiment

—Configuration of Indoor Unit—

Figure 1:
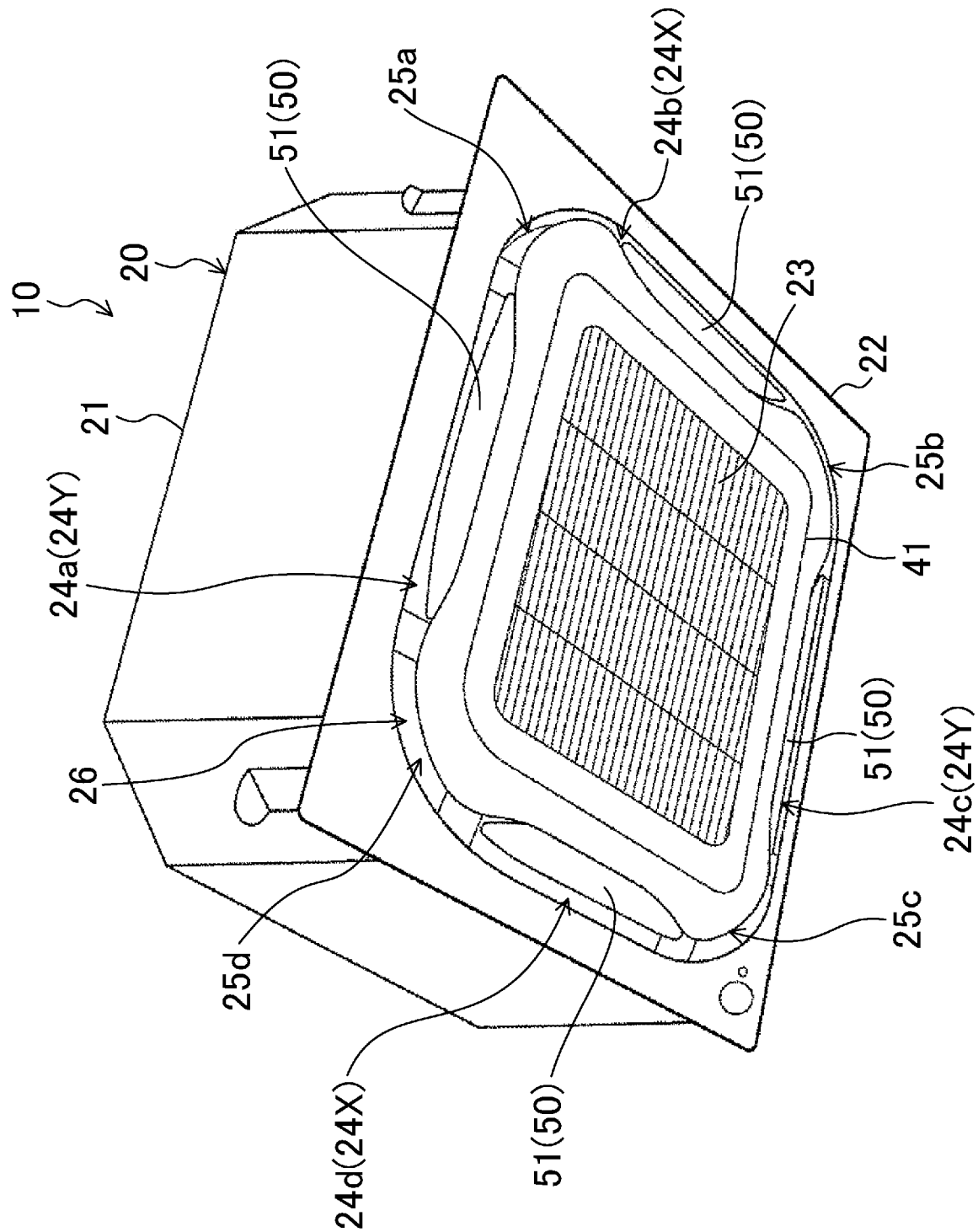
FIG. 1 is a diagram illustrating a perspective view of an indoor unit of a first embodiment viewed obliquely from below.

As illustrated in FIG. 1, an indoor unit (10) of a first embodiment is configured as a ceiling embedded indoor unit. The indoor unit (10) and an outdoor unit (not shown) together form an air-conditioning device. In the air-conditioning device, the indoor unit (10) and the outdoor unit are connected to each other by a communication pipe, thereby forming a refrigerant circuit in which a refrigerant circulates to perform a refrigeration cycle.

As illustrated in FIGS. 1 to 5, the indoor unit (10) has a casing (20) (which corresponds to an indoor casing), an indoor fan (31), an indoor heat exchanger (32), a drain pan (33), a bell mouth (36), an airflow direction adjusting flap (51), a suction temperature sensor (81) (which corresponds to a temperature detector), and an indoor controller (90).

<Casing>

The casing (20) is mounted in the ceiling (501) of an indoor space (500). The casing (20) is comprised of a casing body (21) and a decorative panel (22). The casing (20) houses the indoor fan (31), the indoor heat exchanger (32), the drain pan (33), and the bell mouth (36).

The casing body (21) is mounted by being inserted in, an opening in the ceiling (501) of the indoor space (500). The casing body (21) is in a substantially rectangular parallelepiped box-like shape with an open bottom end. The casing body (21) has approximately a flat top panel (21a) and a side panel (21b) projecting down from a peripheral portion of the top panel (21a).

<Indoor Fan>

Figure 3:
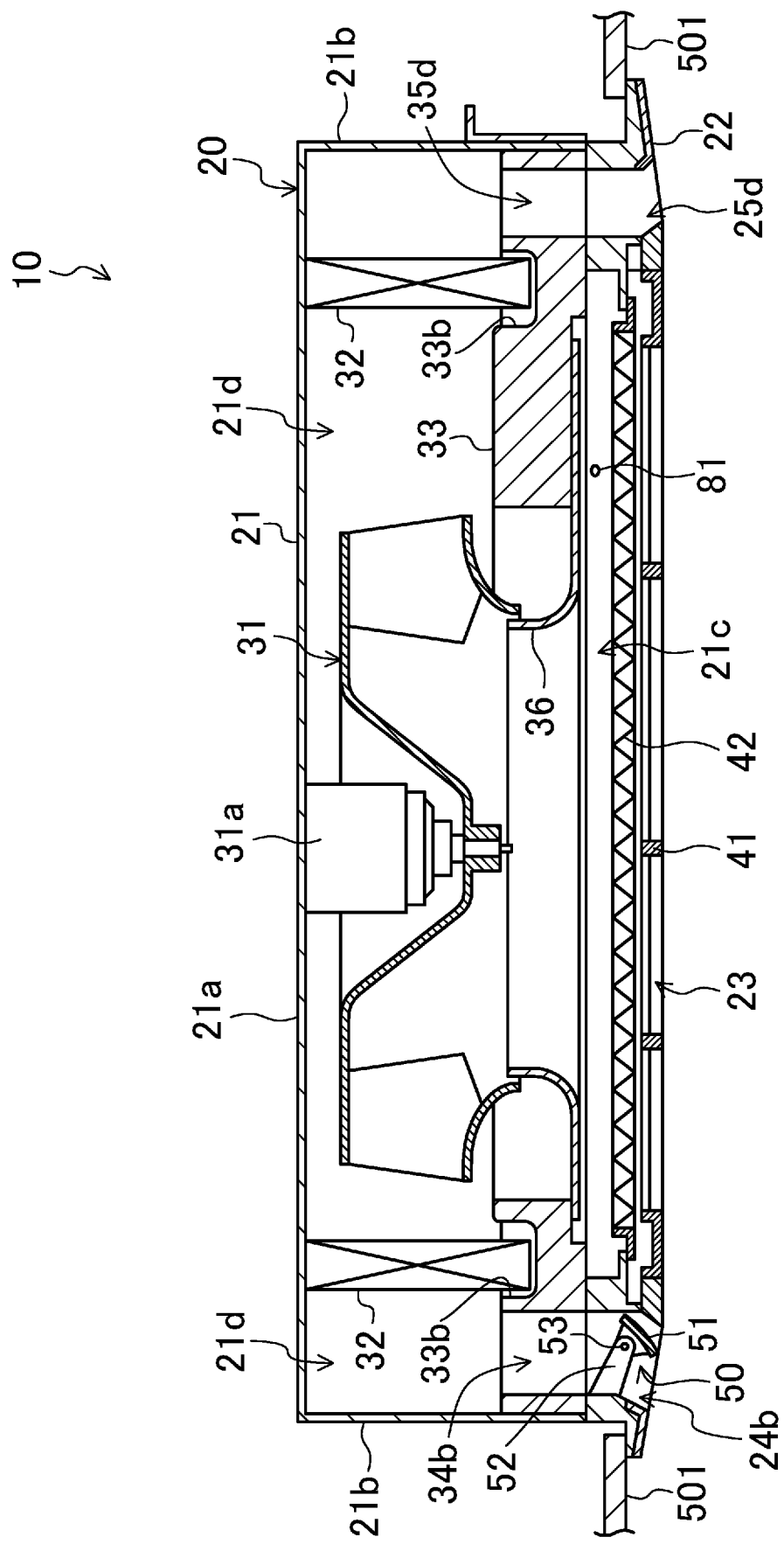
FIG. 3 is a diagram generally illustrating a cross-sectional view of the indoor unit taken along the line III-O-III shown in FIG. 2.

As illustrated in FIG. 3, the indoor fan (31) is a centrifugal fan which blows air, sucked from below, radially outward. The indoor fan (31) is arranged at a central portion in the casing body (21). The indoor fan (31) is driven by an indoor fan motor (31a). The indoor fan motor (31a) is fixed to a central portion of the top panel (21a).

<Bell Mouth>

The bell mouth (36) is located under the indoor fan pi). The bell mouth (36) is a member for guiding air which has flowed in the casing (20) to the indoor fan (31). The bell mouth (36) and the drain pan (33) divide the internal space of the casing (20) into a primal space (21c) on a suction side of the indoor fan (31) and a secondary space (21d) on an air-blowing side of the indoor fan (31).

<Indoor Heat Exchanger>

Figure 2:
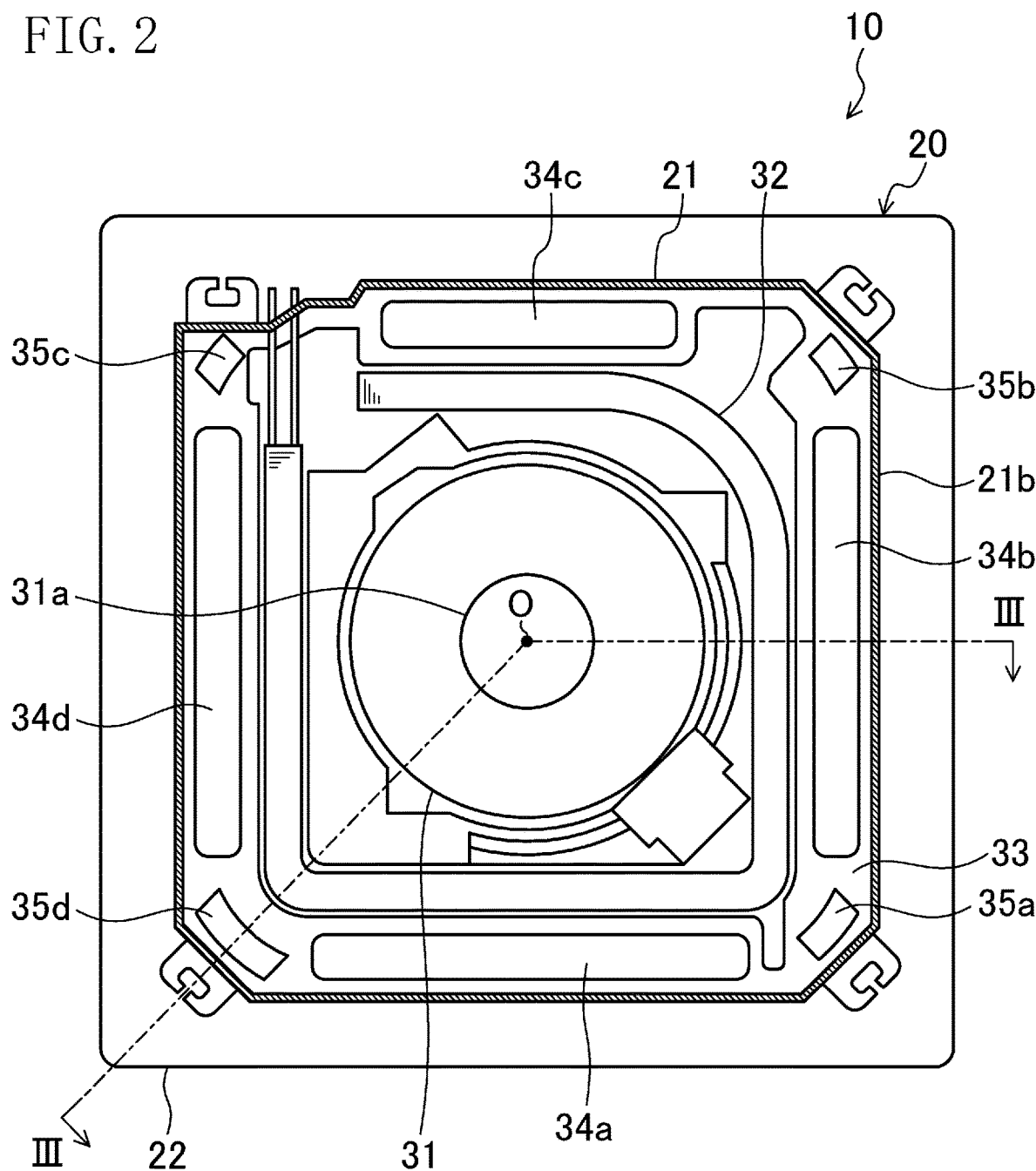
FIG. 2 is a diagram generally illustrating a plan view of the indoor unit from which a top panel of a casing body is omitted.

The indoor heat exchanger (32) is a so-called cross-fin-and-tube heat exchanger. As illustrated in FIG. 2, the indoor heat exchanger (32) is in the shape of a rectangular frame in plan view, and is disposed to surround the indoor fan (31). That is, the indoor heat exchanger (32) is disposed in the secondary space (21d). The indoor heat exchanger (32) allows the air passing therethrough from the inside to the outside to exchange heat with the refrigerant in the refrigerant circuit.

<Drain Pan>

The drain pan (33) is a member made of extruded polystyrene foam. As illustrated in FIG. 3, the drain pan (33) is disposed so as to close the lower end of the casing body (21). A water receiving groove (33b) is formed in the top surface of the drain pan (33) along the bottom end of the indoor heat exchanger (32), A bottom end portion of the indoor heat exchanger (32) is inserted in the water receiving groove (33b). The water receiving groove (33b) receives drain water generated in the indoor heat exchanger (32).

As illustrated in FIG. 2, the drain pan (33) is provided with four main outlet paths (34a to 34d) and four auxiliary outlet paths (35a to 35d). Air which has flowed through the indoor heat exchanger (32) flows through the main outlet paths (34a to 34d) and the auxiliary outlet paths (35a to 35d). These main and auxiliary outlet paths pass through the drain pan (33) in a vertical direction. Each of the main outlet paths (34a to 34d) is a through hole having an elongated rectangular cross section. The main outlet paths (34a to 34d) are disposed along the four sides of the casing body (21). Each side of the casing body (21) is provided with one main outlet path. Each of the auxiliary outlet paths (35a to 35d) is a through hole having a slightly-curved rectangular cross section. The auxiliary outlet paths (35a to 35d) are disposed at four corners of the casing body (21). Each corner of the casing body (21) is provided with one auxiliary outlet path. That is, the drain pan (33) is provided with the main outlet paths (34a to 34d) and the auxiliary outlet paths (35a to 35d) in an alternate manner along the periphery of the drain pan (33).

<Decorative Panel>

The decorative panel (22) is a thick rectangular plate-like resin member. A lower portion of the decorative panel (22) has a square shape larger than the top panel (21a) of the casing body (21). The decorative panel (22) is disposed so as to cover a lower surface of the casing body (21). The lower surface of the decorative panel (22) serves as a lower surface of the casing (20), and is exposed to the indoor space (500).

Figure 4:
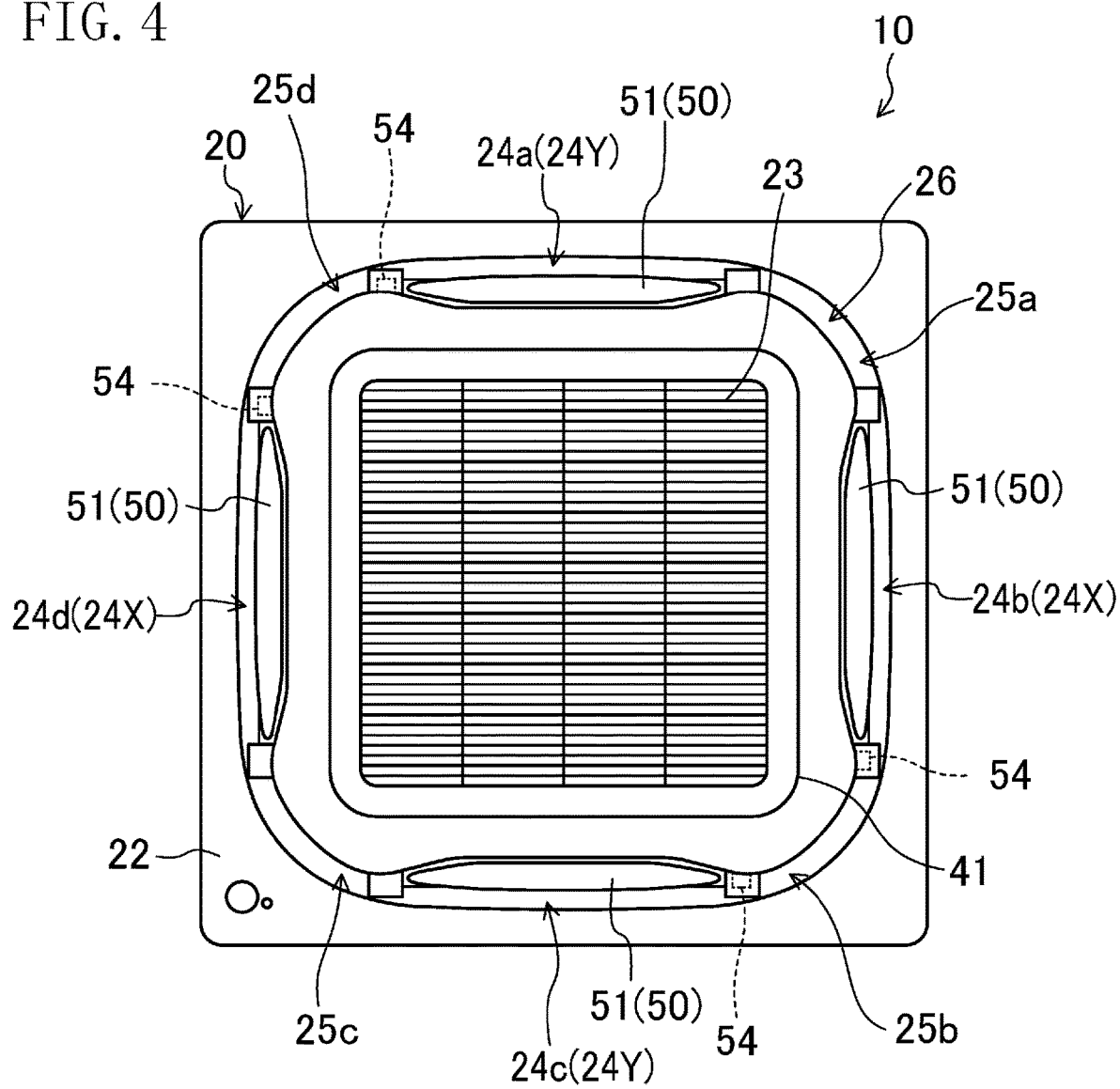
FIG. 4 is a diagram generally illustrating a bottom view of the indoor unit.

As illustrated in FIGS. 3 and 4, one inlet (23) in a square shape (which corresponds to an inlet opening) is formed at a central portion of the decorative panel (22). The inlet (23) passes through the decorative panel (22) in the vertical direction and communicates with the primary space (21c) in the casing (20). Air sucked into the casing (20) flows in the primary space (21c) through the inlet (23). The inlet (23) is provided with a grid-like suction grille (41). A suction filter (42) is provided above the suction grille (41).

The decorative panel (22) is provided with an annular outlet (26) in an approximately rectangular shape which surrounds the inlet (23). As illustrated in FIG. 4, the outlet (26) is divided into four main outlet openings (24a to 24d) (which correspond to outlet openings) and four auxiliary outlet openings (25a to 25d).

Each of the main outlet openings (24a to 24d) has an elongated shape which corresponds to the cross section of each of the main outlet paths (34a to 34d). The main outlet openings (24a to 24d) are disposed along the four sides of the decorative panel (22). Each side of the decorative panel (22) is provided with one main outlet opening.

The outlet openings (24a to 24d) of the decorative panel (22) correspond to the main outlet paths (34a to 34d) of the drain pan (33) on a one-on-one basis. Each of the main outlet openings (24a to 24d) communicates with a corresponding one of the main outlet paths (34a to 34d). That is, the first main outlet opening (24a) communicates with the first main outlet path (34a). The second main outlet opening (24b) communicates with the second main outlet path (34b). The third main outlet opening (24c) communicates with the third main outlet path (34c). The fourth main outlet opening (24d) communicates with the fourth main outlet path (34d).

Each of the auxiliary outlet openings (25a to 25d) is in the shape of a quarter of a circle. The auxiliary outlet openings (25a to 25d) are disposed at the four corners of the decorative panel (22). Each corner of the decorative panel (22) is provided with one auxiliary outlet opening. The auxiliary outlet openings (25a to 25d) of the decorative panel (22) correspond to the auxiliary outlet paths (35a to 35d) of the chain pan (33) on a one-on-one basis. Each of the auxiliary outlet openings (25a to 25d) communicates with a corresponding one of the auxiliary outlet paths (35a to 35d). That is, the first auxiliary outlet opening (25a) communicates with the first auxiliary outlet path (35a). The second auxiliary outlet opening (25b) communicates with the second auxiliary outlet path (35b). The third auxiliary outlet opening (25c) communicates with the third auxiliary outlet path (35c). The fourth auxiliary outlet opening (25d) communicates with the fourth auxiliary outlet path (35d).

<Airflow Direction Adjusting Flap>

As illustrated in FIG. 4, each of the main outlet openings (24a to 24d) is provided with an airflow direction adjusting flap (51). The airflow direction adjusting flap (51) is a member which adjusts the direction of supply airflow (that is, the direction of air coming from the main outlet openings (24*a* to 24*d*)).

The airflow direction adjusting flap (51) changes the direction of supply airflow upward and downward. That is, the airflow direction adjusting flip (51) changes the direction of supply airflow such that the angle between the direction of supply airflow and the horizontal direction changes.

The airflow direction adjusting flap (51) has an elongated plate-like shape extending from one longitudinal end to the other longitudinal end of the main outlet opening (24*a* to 24*d*) formed in the decorative panel (22). As illustrated in FIG. 3, the airflow direction adjusting flap (51) is supported on a support member (52) so as to be rotatable about its own central shaft (53) extending in the longitudinal direction thereof. The airflow direction adjusting flap (51) is curved such that its lateral cross section (a cross section taken in a direction orthogonal to the longitudinal direction) forms a convex shape in a direction away from the central shaft (53) of swing movement.

As illustrated in FIG. 4, a drive motor (54) is coupled to each airflow direction adjusting flap (51). The airflow direction adjusting flap (51) is activated by the drive motor (54) and rotates in a predetermined angle range about the central shaft (53). Although described in detail later, the airflow direction adjusting flap (51) can move to an airflow blocking position where the airflow direction adjusting flap (51) interrupts the flow of air passing through the main outlet opening (24*a* to 24*d*). The airflow direction adjusting flap (51) also functions as an airflow inhibition mechanism (50) which inhibits the supply airflow through the main outlet opening (24*a* to 24*d*).

<Suction Temperature Sensor>

As illustrated in FIG. 3, the suction temperature sensor (81) is disposed near the inlet (23). The suction temperature sensor (81) senses a suction temperature of air being sucked into the casing body (21) through the inlet (23).

<Indoor Controller>

Figure 5:
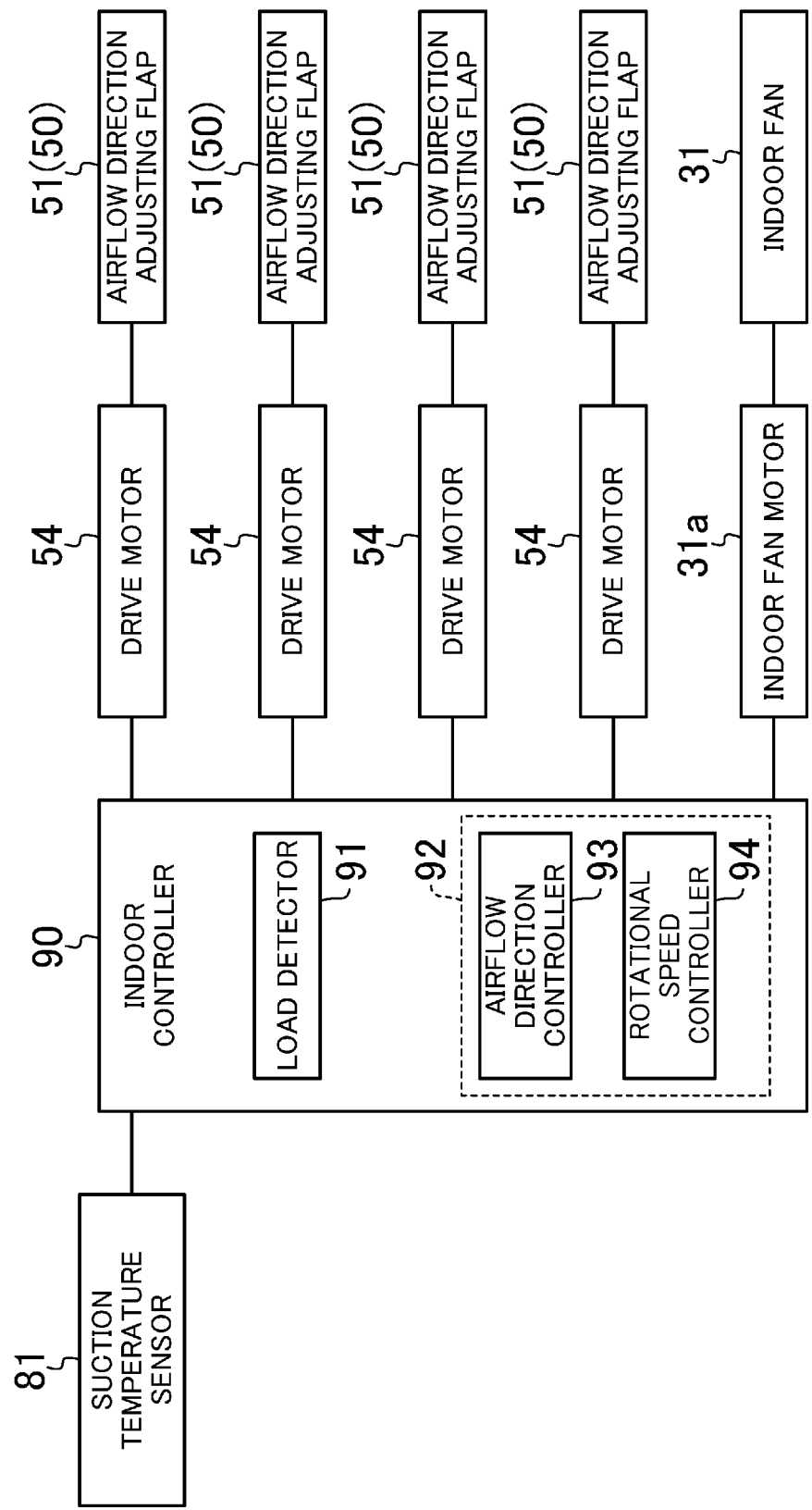
FIG. 5 is a block diagram schematically illustrating an indoor controller and devices connected to the indoor controller according to the first embodiment.

The indoor controller (90) is comprised of a memory and a CPU, and controls the behavior of the indoor unit (10). As illustrated in FIG. 5, the indoor controller (90) is connected to the suction temperature sensor (81), the drive motor (54) of each airflow direction adjusting flap (51), and the indoor fan motor (31*a*) of the indoor fan (31). With the CPU reading and executing various programs stored in the memory, the indoor controller (90) functions as a load detector (91) and a motor controller (92) (which corresponds to a controller). The motor controller (92) includes an airflow direction controller (93) which controls the drive motors (54) to control the direction of airflow coming from the main outlet openings (24*a* to 24*d*), and a rotational speed controller (94) which controls the indoor fan motor (31*a*).

The load detector (91) detects a load of the indoor space (500) based on the suction temperature of air detected by the suction temperature sensor (81). The load of the indoor space (500) is detected by the load detector (91) particularly in the heating operation. Specifically, the load detector (91) detects the load of the indoor space (500) based on a difference between a set temperature for the indoor space (500) in the heating operation and the result (i.e., the suction temperature) detected by the suction temperature sensor (81). The greater the difference is, the higher the load of the indoor space (500) detected in the heating operation is. The smaller the difference is, the lower the load of the indoor space (500) detected in the heating operation is. When this difference is greater than a predetermined value, the load detector (91) detects that the indoor space (500) is in a high load state in which the load of the indoor space (500) is higher than the predetermined value. On the other hand, when the difference is smaller than the predetermined value, the load detector (91) detects that the indoor space (500) is in a low load state in which the load of the indoor space (500) is lower than the predetermined value.

Note that the term "heating operation" used in the present first embodiment includes supplying warm air into the indoor space (500) through the operation of a compressor (not shown) and the indoor fan (31), and also includes a state in which the operation of the compressor is temporarily stopped while keeping the operation of the indoor fan (31) (i.e., a circulation operation).

The airflow direction controller (93) actuates each of the drive motors (54) to control the positions of the airflow direction adjusting flaps (51) independently from one another. Details about the control of the airflow direction controller (93) will be described in "—Control Operation of Airflow Direction Controller—."

The rotational speed controller (94) controls the rotational speed of the indoor fan (31) by control of the indoor fan motor (31*a*).

—Airflow in Indoor Unit—

The indoor fan (31) rotates during an operation of the indoor unit (10). Rotation of the indoor fan (31) causes the indoor air of the indoor space (500) to flow in the primary space (21*c*) of the casing (20) through the inlet (23). The air which has flowed in the primary space (21*c*) is drawn into the secondary space (21*d*) by the indoor fan (31).

The air which has flowed in the secondary space (21*d*) is cooled or heated while passing through the indoor heat exchanger (32), and then flows separately into the four main outlet paths (34*a* to 34*d*) and four auxiliary outlet paths (35*a* to 35*d*). The air which has flowed in the main outlet paths (34*a* to 34*d*) is supplied to the indoor space (500) through the main outlet openings (24*a* to 24*d*). The air which has flowed in the auxiliary outlet paths (35*a* to 35*d*) is supplied to the indoor space (500) through the auxiliary outlet openings (25*a* to 25*d*).

That is, the indoor fan (31) generates the flow of air coming into the casing body (21) from the indoor space (500) through the inlet (23) and supplied back into the indoor space (500) through the outlet (26).

In the indoor unit (10) performing a cooling operation, the indoor heat exchanger (32) serves as an evaporator to cool the air while the air passes through the indoor heat exchanger (32). On the other hand, in the indoor unit (10) performing a heating operation, the indoor heat exchanger (32) serves as a condenser to heat the air while the air passes through the indoor heat exchanger (32).

—Movement of Airflow Direction Adjusting Flap—

As described earlier, the airflow direction adjusting flap (51) rotates about the central shaft (53), thereby changing the direction of supply airflow. The airflow direction adjusting flap (51) is movable between a horizontal airflow position illustrated in FIG. 6 and a downward airflow position illustrated in FIG. 7. The airflow direction adjusting flap (51) may further rotate from the downward airflow position illustrated in FIG. 7 and move to an airflow blocking position illustrated in FIG. 8.

Figure 6:
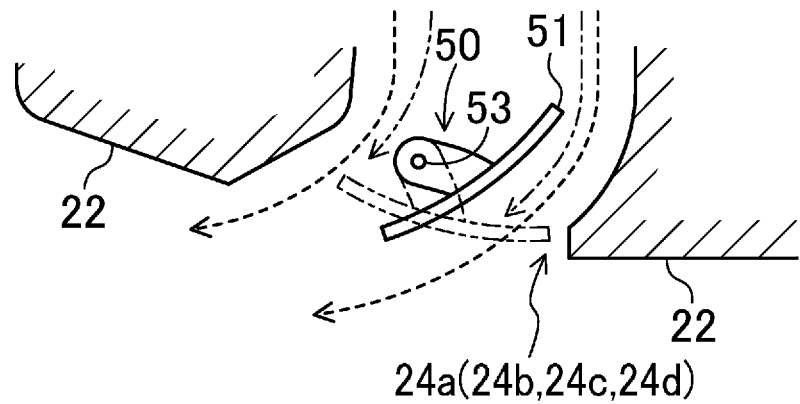
FIG. 6 is a diagram illustrating a cross-sectional view of a main part of a decorative panel, showing an airflow direction adjusting flap in a horizontal airflow position.

When the airflow direction adjusting flap (51) is in the horizontal airflow position illustrated in FIG. 6, the downward direction of the air coming from the main outlet path (34*a* to 34*d*) is changed to a lateral direction, and the supply airflow coming from the main outlet opening (24*a* to 24*d*) is horizontal. In this case, the direction of supply airflow through the main outlet opening (24*a* to 24*d*) (that is, the direction of air coming from the main outlet opening (24a to 24d)) is set to be about 25° from the horizontal direction. That is, strictly saying, the direction of the supply airflow is angled slightly downward from the horizontal direction, but substantially the same as the horizontal direction. The horizontal supply airflow allows the air coming from the main outlet opening (24a to 24d) to reach a wall (502) of the indoor space (500).

Figure 7:
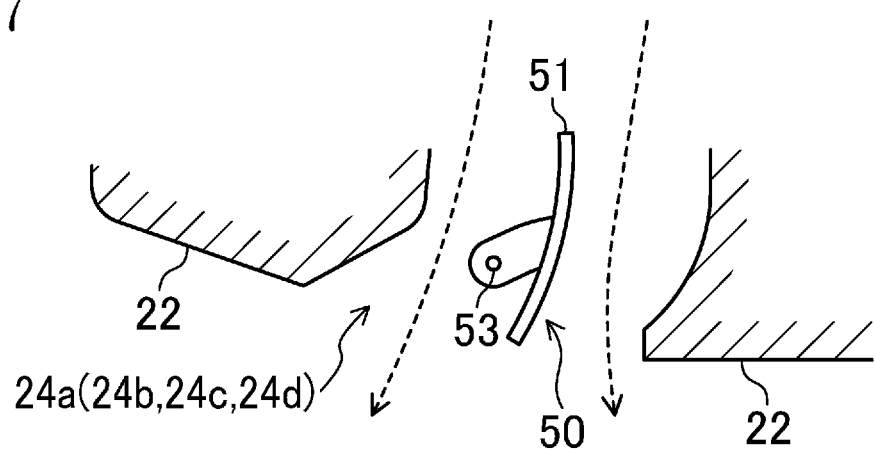
FIG. 7 is a diagram illustrating a cross-sectional view of the main part of the decorative panel, showing the airflow direction adjusting flap in a downward airflow position.

When the airflow direction adjusting flap (51) is in the downward airflow position illustrated in FIG. 7, the downward direction of the air coming from the main outlet path (34a to 34d) is maintained substantially as it is, and the supply airflow coming from the main outlet opening (24a to 24d) is directed downward. In this case, strictly saying, the direction of the supply airflow is slightly angled from the vertical direction, that is, obliquely downward, away from the inlet (23).

Figure 8:
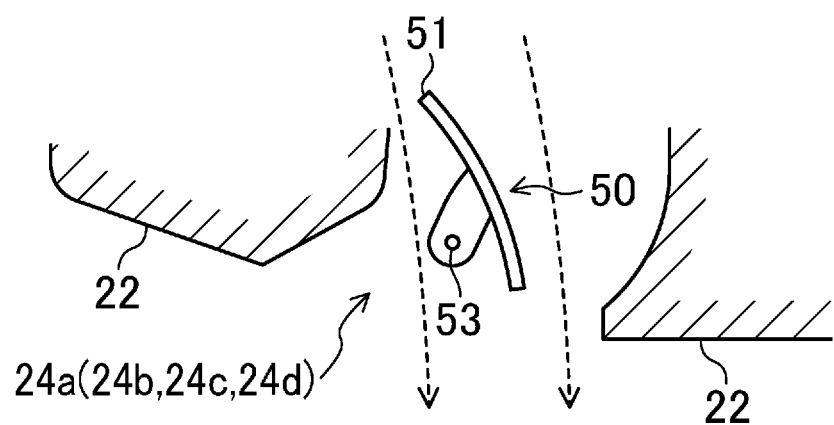
FIG. 8 is a diagram illustrating a cross-sectional view of the main part of the decorative panel, showing the airflow direction adjusting flap in an airflow blocking position.

When the airflow direction adjusting flap (51) is in the airflow blocking position illustrated in FIG. 8, a large portion of the main outlet opening (24a to 24d) is closed by the airflow direction adjusting flap (51), and the downward direction of the air coming from the main outlet path (34a to 34d) is changed toward the inlet (23). In this case, the pressure loss of the air passing through the main outlet opening (24a to 24d) increases, and the flow rate of the air passing through the main outlet opening (24a to 24d) decreases. Further, since the air is supplied toward the inlet (23) from the main outlet opening (24a to 24d), the air coming from the main outlet opening (24a to 24d) is immediately sucked in the inlet (23). That is, substantially no air is supplied to the indoor space (500) through the main outlet opening (24a to 24d) when the airflow direction adjusting flap (51) is in the airflow blocking position.

—Control Operation of Airflow Direction Controller—

<Basic Airflow in Heating Operation>

First, basic control operation of the airflow direction controller (93) of the first embodiment will be described.

When the load detector (91) detects in the heating operation that the load of the indoor space (500) is high, the airflow direction controller (93) controls the airflow direction adjusting flap (51) such that the airflow direction coming from the main outlet opening (24a to 24d) is horizontal (i.e., a horizontal airflow mode).

Heating operation is performed when the outside air temperature is relatively low such as in winter. In such a situation, cold air may enter the indoor space (500) from near the walls of the indoor space (500). This phenomenon should be remarkable when the load of the indoor space (500) is high. To address this phenomenon, in the first embodiment, the air coming from the main outlet opening (24a to 24d) is guided to flow in the horizontal direction by the airflow direction adjusting flap (51) when the load of the indoor space (500) is high in the heating operation. As a result, the relatively warm air coming from the main outlet opening (24a to 24d) reaches the wall (502) of the indoor space (500) and flows down along the wall (502). The wall (502) of the indoor space (500) is warmed by the air, and the temperature of the wall (502) of the indoor space (500) increases. The air which has reached the wall (502) blocks the cold air from entering the indoor space (500) from the wall (502). Consequently, the difference in temperature between a central portion and a peripheral portion (near the wall) of the indoor space (500) becomes small.

Further, in the first embodiment, when the load of the indoor space (500) is detected high in the heating operation (i.e., in the horizontal airflow mode), the speed of the air coming from the main outlet opening (24a to 24d) is also controlled to be higher than when the load of the indoor space (500) is low (i.e., in a usual airflow mode) in the heating operation.

Example methods for increasing the speed of the air include the following three methods (I) to (III):

(I) The airflow direction controller (93) sets any of the four airflow direction adjusting flaps (51) to the airflow blocking position illustrated in FIG. 8.

(II) The rotational speed controller (94) controls the rotational speed of the indoor fan (31) to be higher than when the load of the indoor space (500) is low.

(III) The airflow direction controller (93) sets any of the airflow direction adjusting flaps (51) to the airflow blocking position illustrated in FIG. 8, and the rotational speed controller (94) sets the rotational speed of the indoor fan (31) at a higher rotational speed than when the load of the indoor space (500) is low.

In the method (I), the airflow direction adjusting flap (51) of, for example, one main outlet opening (24a) is set to the airflow blocking position, and the airflow direction adjusting flaps (51) of the other main outlet openings (24b to 24d) are set to be horizontal (i.e., the horizontal airflow position). That is, according to the method (I), the total opening area of the main outlet openings (24a to 24d) is smaller than when the load of the indoor space (500) is low in the heating operation. In this case, substantially no air is supplied to the indoor space (500) from the main outlet opening (24a). However, air is supplied to the indoor space (500) from the other main outlet openings (24b to 24d) substantially in the horizontal direction at a higher speed than when the air is supplied from all the main outlet openings (24a to 24d).

According to the method (II), the rotational speed of the indoor fan (31) is increased. Thus, needless to say, air is supplied at an increased speed substantially in the horizontal direction from the main outlet openings (24a to 24d) set to the horizontal airflow position.

The method (III) employs both methods (I) and (II). In this case, air is supplied horizontally at a higher speed than in the methods (I) and (II) through the main outlet openings (24a to 24d) provided with the airflow direction adjusting flaps (51) taking the horizontal airflow position.

The higher speed of the air that is increased by either one of the methods (I) to (III) contributes to reliably delivering the relatively warm air to the vicinity of the wall of the indoor space (500). As a result, the wall (502) of the indoor space (500) is warmed more reliably than when the speed of the air is not increased (that is, in the usual airflow mode), and the cold air is more reliably blocked from entering the indoor space (500) from the wall (502).

Note that in the heating operation, a usual airflow operation, which will be described in the "airflow rotation" below, may be performed when the load of the indoor space (500) is low (i.e., in the usual airflow mode). In the usual airflow mode, the airflow direction is horizontal due to the airflow direction adjusting flap (51) taking the horizontal airflow position. However, the speed of the air in the usual airflow mode may be controlled to be slower than in the horizontal airflow mode.

<Example Application of Airflow in Heating Operation: Airflow Rotation>

Now, an example application of the horizontal airflow mode, described above, will be described.

Figure 9:
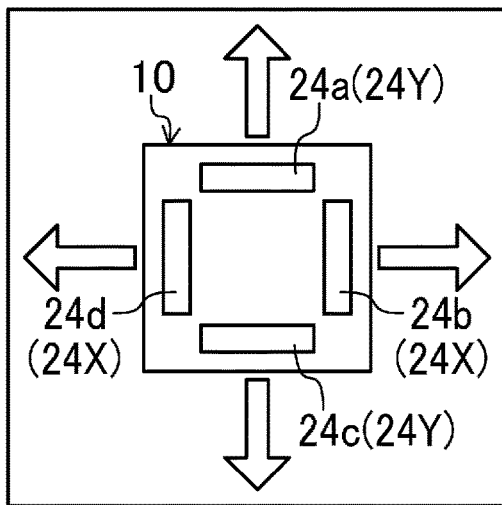
FIG. 9 is a diagram for explaining a single airflow rotation cycle performed by the indoor unit, and schematically illustrates a bottom surface of the indoor unit making each movement.
Figure 9:
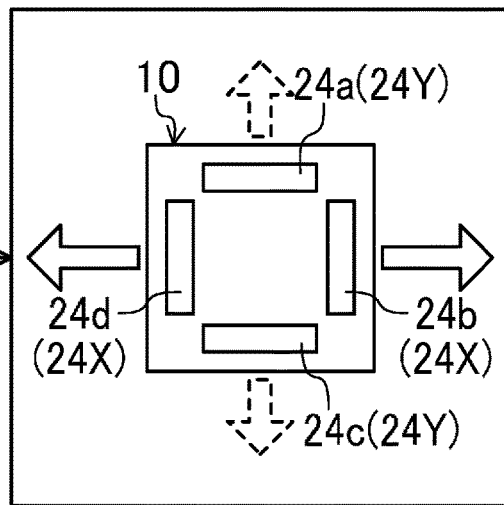
Figure 9:
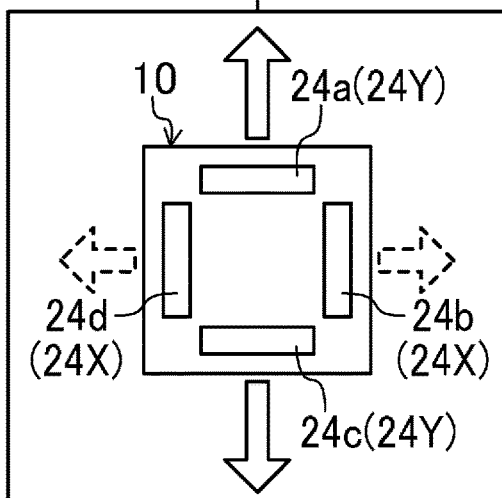
Figure 9:
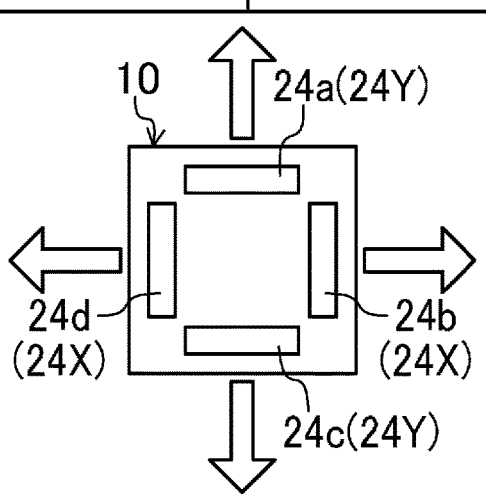

In the example application, the airflow direction controller (93) controls the position of the airflow direction adjusting flap (51) such that the indoor unit (10) can carry out a usual airflow operation, a first airflow operation, and a second airflow operation, which will be described later. The airflow direction controller (93) also controls the positions of the airflow direction adjusting flaps (51) of the main outlet openings (24a to 24d) such that the indoor unit (10) carries out an airflow rotation illustrated in FIG. 9. As illustrated in FIG. 9, a first-time usual airflow operation, a first airflow operation, a second-time usual airflow operation, and a second airflow operation are sequentially performed in a single cycle of the airflow rotation. That is, in a single cycle of the airflow rotation, the usual airflow operation is performed twice; the first airflow operation is performed once; and the second airflow operation is performed once.

Note that the rotational speed of the indoor fan (31) is kept substantially constant during the airflow rotation. An example case will be described below in which the method (I) is employed as a method for increasing the speed of the air during the airflow rotation.

In the following description, for convenience of explanation, the second and fourth main outlet openings (24b) and (24d) along the two sides of the decorative panel (22) facing each other are called "first opening (24X)" and the first and third main outlet openings (24a) and (24c) are called "second opening (24Y)" as illustrated in FIGS. 1, 4, and 9.

In the usual airflow operation in the heating operation, the airflow direction controller (93) sets the airflow direction adjusting flaps (51) of all the main outlet openings (24a to 24d) to the downward airflow position. Thus, the air is supplied downward from the four main outlet openings (24a to 24d) in the usual airflow operation in the heating operation.

In the first airflow operation in the heating operation, the airflow direction controller (93) sets the airflow direction adjusting flaps (51) of the two main outlet openings (24b, 24d) which form the first opening (24X) to the horizontal airflow position, and sets the airflow direction adjusting flaps (51) of the two main outlet openings (24a, 24c) which form the second opening (24Y) to the airflow blocking position. Thus, the air is supplied to the indoor space (500) from the second and fourth main outlet openings (24b) and (24d), and substantially no air is supplied to the indoor space (500) from the first and third main outlet openings (24a) and (24c). The speed of air coming from the second and fourth main outlet openings (24b) and (24d) is higher than the speed of air in the usual airflow operation. Thus, in the first airflow operation, the air is supplied substantially horizontally from the second and fourth main outlet openings (24b) and (24d) at a higher flow speed than in the usual airflow operation.

In the second airflow operation in the heating operation, the airflow direction controller (93) sets the airflow direction adjusting flaps (51) of the two main outlet openings (24a, 24c) which form the second opening (24Y) to the horizontal airflow position, and sets the airflow direction adjusting flaps (51) of the two main outlet openings (24b, 24d) which form the first opening (24X) to the airflow blocking position. Thus, the air is supplied to the indoor space (500) from the first and third main outlet openings (24a) and (24c), and substantially no air is supplied to the indoor space (500) from the second and fourth main outlet openings (24b) and (24d). The speed of air coming from the first and third main outlet openings (24a) and (24c) is higher than the speed of air in the usual airflow operation. Thus, in the second airflow operation, the conditioned air is supplied substantially horizontally from the first and third main outlet openings (24a) and (24c) at a higher flow speed than in the usual airflow operation.

Note that the air is supplied from the auxiliary outlet openings (25a to 25d) in all of the usual airflow operation, the first airflow operation, and the second airflow operation.

In the single cycle, illustrated in FIG. 9, of the airflow rotation in the heating operation, the first-time usual airflow operation, the first airflow operation, the second-time airflow operation, and the second airflow operation have the same duration time (e.g., 120 seconds).

<Temperature Distribution of Indoor Space in Heating Operation>

Temperature distribution of the indoor space (500) in the heating operation will be described with reference to FIG. 10.

Figure 10:
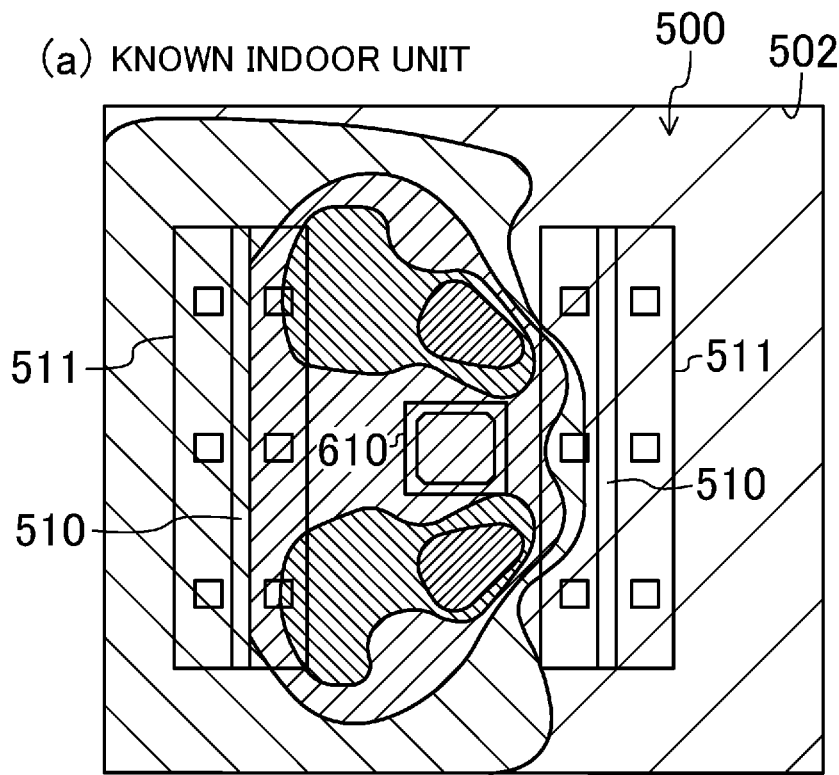
FIGS. 10A and 10B each illustrate a plan view of the indoor space, showing temperature distributions in the indoor space when the indoor unit is performing the airflow rotation during a heating operation.
Figure 10:
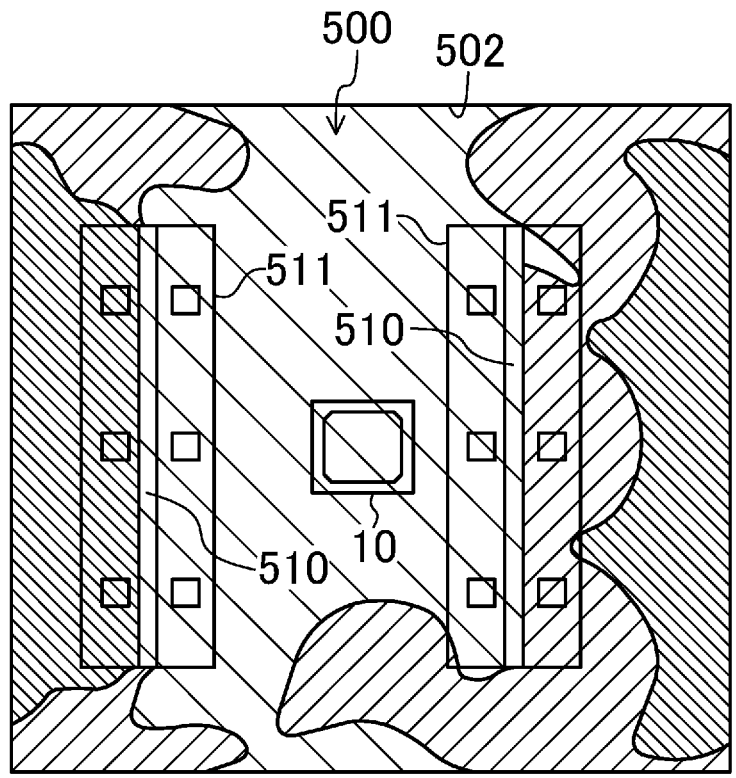

FIG. 10 illustrates results of simulation of the temperature distribution of the indoor space (500) during the heating operation of the indoor unit (10). FIG. 10 illustrates temperatures at a height of 60 cm above the floor surface of the indoor space (500) after 20 minutes from the start of the heating operation of the indoor unit (10). In FIG. 10, higher temperatures are illustrated by a higher density of hatching.

Note that such a room as follows is used as a simulation target room which has approximately a square floor surface and is furnished with two long desks (511) arranged parallel to each other with a partition (510) provided at a middle portion of each desk. The indoor unit (10) is located at approximately a center of the ceiling of the indoor space (500).

First, temperature distribution of the indoor space (500) provided with a known indoor unit (610) will be described with reference to FIG. 10A.

In a heating operation, the known indoor unit (610) sets the airflow direction adjusting flaps (51) of all the main outlet openings (24a to 24d) to the downward airflow position. The known indoor unit (610) supplies air which has been heated while passing through the indoor heat exchanger (32) substantially toward the floor surface from all the main outlet openings (24a to 24d).

As illustrated in FIG. 10A, a central region of the indoor space (500) under the indoor unit (610) has a very high temperature. This may be because the warm conditioned air supplied downward from the indoor unit (610) remains in the central region of the indoor space (500) in between the two partitions (510).

On the other hand, the temperature is not sufficiently increased in a peripheral region of the indoor space (500) apart from the indoor unit (610). This may be because the warm conditioned air supplied downward from the indoor unit (610) could not reach the region near the walls (502) over the partitions (510).

Now, temperature distribution of the indoor space (500) provided with the indoor unit (10) of the first embodiment will be described with reference to FIG. 10B. The indoor unit (10) carries out the airflow rotation described above as an example application.

In the usual airflow operation, the warm conditioned air supplied downward from the indoor unit (10) is supplied to a central region of the indoor space (500) in between the two partitions (510). Thus, the temperature increases in the central region of the indoor space (500) under the indoor unit (10). However, since the usual airflow operation is performed intermittently, the temperature in the central region of the indoor space (500) does not increase excessively.

On the other hand, in the first and second airflow operations, the warm conditioned air is supplied from the indoor unit (10) at a higher flow speed than in the usual airflow operation in substantially the horizontal direction. Thus, in the first and second airflow operations, the warm conditioned air supplied from the indoor unit (10) reaches the wall (502) of the indoor space (500) over the partitions (510). The temperature therefore increases in the peripheral region, too, of the indoor space (500) apart from the indoor unit (10).

In the first and second airflow operations, the warm conditioned air supplied from the indoor unit (10) reaches the wall (502) of the indoor space (500) and flows down along the wall (502). The wall (502) of the indoor space (500) is warmed by the conditioned air. The temperature of the wall (502) of the indoor space (500) increases accordingly. The temperature in the peripheral region of the indoor space (500) is less likely to drop due to the wall (502) warmed by the conditioned air.

The airflow rotation in the heating operation greatly reduces the difference in the temperature between the central and peripheral regions of the indoor space (500), compared to the case where the known indoor unit (610) performs the heating operation.

<Airflow in Cooling Operation>

In the cooling operation, the airflow direction controller (93) sets the airflow direction adjusting flaps (51) of, for example, all the main outlet openings (24*a* to 24*d*) to alternately take the horizontal airflow position and the downward airflow position. Thus, airflow of the relatively cool air supplied from the main outlet openings (24*a* to 24*d*) changes according to the movement of each of the airflow direction adjusting flaps (51).

—Advantages of First Embodiment—

The indoor unit (10) of the first embodiment supplies the air to the indoor space (500) in the horizontal direction when the load of the indoor space (500) in the heating operation is high (i.e., in the horizontal airflow mode). The relatively warm air can therefore reach the vicinity of the wall of the indoor space (500) from where cold air is likely to enter the indoor space (500). The relatively warm air blocks the cold air from coming into the indoor space (500) from near the wall. Entrance of cold air into the indoor space (500) from near the wall can be avoided in this manner. Consequently, the difference in temperature between a central portion and a peripheral portion (near the wall) of the indoor space (500) becomes small.

In the first embodiment, the load of the indoor space (500) in the heating operation is determined by the difference between the set temperature and the suction temperature. This means that the load of the indoor space (500) in the heating operation can be determined by a simple method.

Further, in the first embodiment, when the load of the indoor space (500) is detected high in the heating operation (i.e., in the horizontal airflow mode), the speed of the air coming from the main outlet opening (24*a* to 24*d*) is controlled to be higher than when the load of the indoor space (500) in the heating operation is low. Thus, the relatively warm air can reach the vicinity of the wall more easily. Entrance of cold air into the indoor space (500) from near the wall can be avoided more reliably.

Like the method (I) described above, reducing the total opening area of the main outlet openings (24*a* to 24*d*) can be one of example methods for increasing the speed of air. According to this method, the speed of air can be easily increased.

The method (I) can be carried out by the airflow direction adjusting flap (51) configured to be movable to the position where the flow of air is inhibited. This configuration allows the air to be supplied at a higher speed by reducing the total opening area of the main outlet openings (24*a* to 24*d*) without any other mechanism for inhibiting the flow of air provided independently of the airflow direction adjusting flap (51).

Like the method (II) described above, increasing the rotational speed of the indoor fan (31) can be one of example methods for increasing the speed of air. According to this method, as well, the speed of air can be easily increased.

The method (III) described above can also be employed as one of example methods for increasing the speed of air. According to the method (III), the flow of air can be increased more reliably.

—First Variation of First Embodiment—

The indoor unit (10) is not limited to the ceiling embedded type. The indoor unit (10) may be of a ceiling suspended type or of a wall hanging type. Whatever the type of the indoor unit (10) is, the direction of air coming from the main outlet opening (24*a* to 24*d*) may be suitably determined so that the air reaches the vicinity of the wall of the indoor space (500) when the load of the indoor space (500) is high in the heating operation. Thus, in the ceiling mounted type and the wall hanging type, the airflow direction controller (93) may control the airflow direction adjusting flap (51) such that the air coming from the main outlet opening (24*a* to 24*d*) is directed upward with respect to the horizontal direction (for example, such that the airflow direction adjusting flap (51) is angled 25° upward with respect to the horizontal direction) when the load of the indoor space (500) is high in the heating operation. For example, the air coming from the main outlet opening (24*a* to 24*d*) may be supplied upward with respect to the horizontal direction using the Coanda effect.

—Second Variation of First Embodiment—

The angle of the airflow direction adjusting flap (51), while taking the horizontal airflow position, with respect to the horizontal direction may be finely adjusted as necessary, according to the distance from the location of the indoor unit (10) and the wall surface of the indoor space (500), so that the air coming from the main outlet opening (24*a* to 24*d*) can reach the vicinity of the wall of the indoor space (500). The distance from the location of the indoor unit (10) to the wall surface of the indoor space (500) may be input to the indoor controller (90) at the installation of the indoor unit (10) in the indoor space (500) by a worker who installs the indoor unit (10). Alternatively, a sensor for detecting the distance may be attached to the indoor unit (10) in advance.

—Third Variation of First Embodiment—

The load detector (91) may use, when detecting the load of the indoor space (500), a value corrected from the detection result of the suction temperature sensor (81) without using the detection result itself of the suction temperature sensor (81). Thus, the load detector (91) can detect an accurate load of the indoor space (500). This method is effective when the air coming from the main outlet opening (24*a* to 24*d*) and the auxiliary outlet opening (25*a* to 25*d*) does n t circulate in the indoor space (500) and is directly drawn into the casing (20) through the inlet (23).

—Fourth Variation of First Embodiment—

The method for detecting the load of the indoor space (500) in the heating operation is not limited to the method using the set temperature and the detection result of the suction temperature sensor (81). For example, the load detector (91) may detect the load of the indoor space (500) in the heating operation, using a mean value of the detection result of the suction temperature sensor (81) and a floor temperature of the indoor space (500). In this case, not the detection result itself of the suction temperature sensor (81), but a value corrected from the detected result of the suction temperature sensor (81) may be used.

The load of the indoor space (500) in the heating operation may be determined from a wall surface load or a floor surface load of the indoor space (500).

The load of the indoor space (500) in the heating operation may be detected at predetermined intervals, or may be detected when a user of the indoor space (500) sends an instruction via a remote controller.

—Fifth Variation of First Embodiment—

The load of the indoor space (500) in the heating operation may be detected by using a detection result, or a corrected value of the detection result, of a sensor provided separately in the indoor space (500) for detecting a room temperature, instead of the suction temperature sensor (81). Types of the sensor provided separately for detecting a room temperature may include not only a wired communication sensor, but also a wireless communication sensor.

—Sixth Variation of First Embodiment—

The number of main outlet openings (24*a* to 24*d*) is not limited to four. For example, one or two main outlet openings may be provided.

—Seventh Variation of First Embodiment—

The indoor unit (10) may have a shutter for closing the main outlet opening (24*a* to 24*d*) in addition to the airflow direction adjusting flap (51) as an airflow inhibition mechanism. Preferably, in this case, the airflow inhibition mechanism is provided to correspond to each of the main outlet openings (24*a* to 24*d*). For example, the airflow inhibition mechanism may be configured as an open/close shutter.

—Eighth Variation of First Embodiment—

The airflow rotation in the heating operation described above (as an example application) is not limited to such rotation as illustrated in FIG. 9. For example, the airflow rotation may be carried out by repeating the usual airflow operation, the first airflow operation, and the second airflow operation in a sequential manner.

—Ninth Variation of First Embodiment—

The first and second airflow operations of the airflow rotation (an example application) may be carried out by supplying the air to the indoor space (500) from two main outlet openings (24*a* to 24*d*) arranged next to each other, and setting the airflow direction adjusting flaps (51) of the other two main outlet openings (24*a* to 24*d*) arranged next to each other to the airflow blocking position.

—Tenth Variation of First Embodiment—

It is not essential to carry out the control to increase the speed of air. In carrying out the control to increase the speed of air, methods except the methods (I) to (III) described above may be employed.

Thus, as a method for increasing the speed of air in the airflow rotation, the method (II) or (III) may be employed instead of the method (I), or any other method besides the methods (I) to (III) may be employed.

—Eleventh Variation of First Embodiment—

The duration time of the operations in the airflow rotation does not have to be the same (e.g., 120 seconds), but may be different among the operations.

—Twelfth Variation of First Embodiment—

If the method (I) or (III) is employed as the control to increase the speed of air, the airflow direction adjusting flap (51) may close the corresponding main outlet opening (24*a* to 24*d*) completely, instead of taking the airflow blocking position in FIG. 8.

Second Embodiment

The first embodiment has described a case in which the load of the indoor space (500) is automatically detected by the load detector (91), and according to the detection result, the airflow direction adjusting flap (51) takes the horizontal airflow position. A second embodiment will describe a case in which the airflow direction adjusting flap (51) takes the horizontal airflow position when a person in the room sends such an instruction via a remote controller (201).

—Configuration of Indoor Unit—

Figure 11:
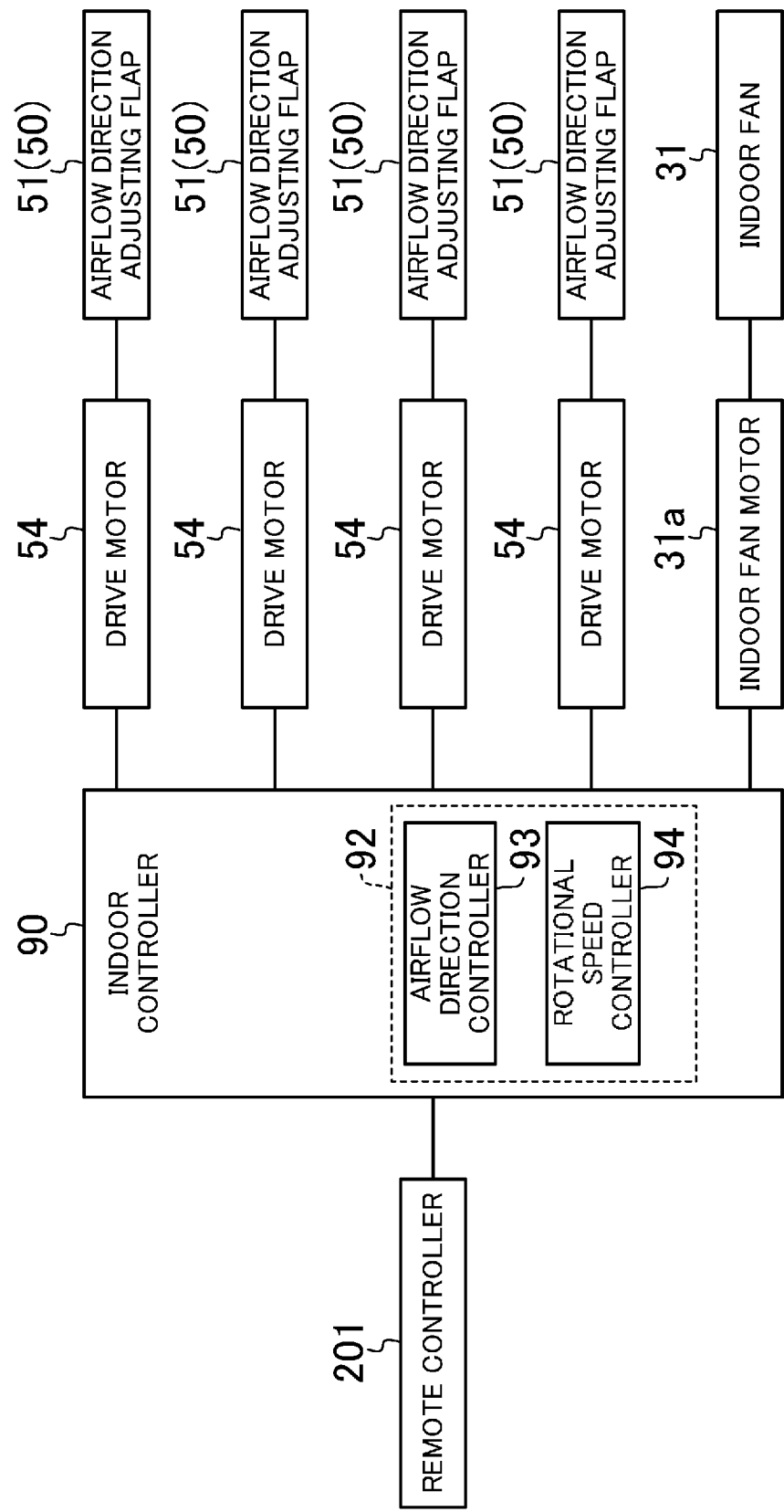
FIG. 11 is a block diagram schematically illustrating an indoor controller and devices connected to the indoor controller according to a second embodiment.

Similarly to the indoor unit of the first embodiment, an indoor unit (10) according to the second embodiment supplies air to the indoor space (500). The indoor unit (10) according to the second embodiment has a casing (20) (which corresponds to an indoor casing), an indoor fan (31), an indoor heat exchanger (32), a drain pan (33), a bell mouth (36), an airflow direction adjusting flap (51), an indoor controller (90), and a remote controller (201) (which corresponds to a receiver). As illustrated in FIG. 11, the indoor controller (90) is connected to a drive motor (54) of each airflow direction adjusting flap (51), and an indoor fan motor (31*a*) of the indoor fan (31), and further to the remote controller (201). The indoor controller (90) functions as a motor controller (92) (which corresponds to a controller) having an airflow direction controller (93) and a rotational speed controller (94).

That is, as explicitly illustrated in FIG. 11, the indoor unit (10) of the second embodiment does not have to be provided with the suction temperature sensor (81) of the first embodiment. The indoor controller (90) does not function as the load detector (91) of the first embodiment.

Note that the casing (20), the indoor fan (31), the indoor heat exchanger (32), the drain pan (33), the bell mouth (36), and the airflow direction adjusting flap (51) of the second embodiment are the same as, or similar to, those of the first embodiment.

Specifically, the casing (20) is comprised of a casing body (21) and a decorative panel (22), and is provided with a plurality of outlet openings (24*a* to 24*d* and 25*a* to 25*d*) and a single inlet (23). The indoor fan (31) generates the flow of air coming into the casing body (21) from the indoor space (500) through the inlet (23) and supplied back into the indoor space (500) through the outlet openings (24*a* to 24*d* and 25*a* to 25*d*). The indoor heat exchanger (32) allows the air drawn into the casing (20) to exchange heat with refrigerant. The drain pan (33) receives drain water generated in the indoor heat exchanger (32). The bell mouth (36) guides the air which has flowed in the casing (20) to the indoor fan (31). The airflow direction adjusting flap (51) is provided at a corresponding one of the main outlet openings (24*a* to 24*d*), and changes the direction of airflow coming from the main outlet opening (24*a* to 24*d*) in the vertical direction.

Detailed description about the airflow in the indoor unit and the movement of the airflow direction adjusting flap will be omitted since the description is the same as, or similar to, "—Airflow in The Indoor Unit—" and "—Movement of Airflow Direction Adjusting Flap—" in the first embodiment.

<Remote Controller>

The remote controller (201) is attached, for example, to the wall (502) of the indoor space (500), and is connected to the indoor controller (90) such that wired or wireless communication can be established with the indoor controller (90). The remote controller (201) receives an instruction from a person in the room. That is, the person in the room can adjust various settings of the air-conditioning device and operating instructions via the remote controller (201). The remote controller (201) which has received a setting instruction or an operating instruction sends the instruction to the indoor controller (90).

In particular, the indoor unit (10) of the second embodiment has a horizontal airflow mode in which air is supplied intentionally in the horizontal direction. Although not shown, the remote controller (201) has a horizontal airflow mode selecting button for receiving an external instruction selecting the horizontal airflow mode. When the horizontal airflow mode is selected by the button, the remote controller (201) informs the indoor controller (90) of the selection of the horizontal airflow mode.

The horizontal airflow mode may be selected by the button by a person in the room when the person has instructed the start of a heating operation via the remote controller (201) but still feels that the temperature is lower near the wall of the indoor space (500) than a central portion of the indoor space (500). That is, the person in the room may select the horizontal airflow mode by the button when the person himself/herself feels that the load of the indoor space (500) is high.

—Control Operation of Airflow Direction Controller—

<Basic Airflow in Heating Operation>

When the information indicating the selection of the horizontal airflow mode is transmitted from the remote controller (201) during the heating operation, the airflow direction controller (93) of the second embodiment controls each of the airflow direction adjusting flaps (51) such that the airflow direction coming from the main outlet openings (24a to 24d) is horizontal. That is, the airflow direction controller (93) sets the airflow direction adjusting flaps (51) to the horizontal airflow position, so that the airflow direction coming from the main outlet openings (24a to 24d) be horizontal, when the person in the room feels that the load of the indoor space (500) is high.

When the information indicating the selection of the horizontal airflow mode is transmitted from the remote controller (201) during the heating operation, the motor controller (92) controls the speed of air coming from the main outlet openings (24a to 24d) to be higher than when the remote controller (201) does not receive the selection of the horizontal airflow mode (i.e., when the horizontal airflow mode is not selected, that is, the indoor unit is in the usual airflow mode). Example methods for increasing the speed of the air include the following three methods (I) to (III):

(I) The airflow direction controller (93) sets any of the four airflow direction adjusting flaps (51) to the airflow blocking position illustrated in FIG. 8. That is, the airflow direction controller (93) sets the total opening area of the main outlet openings (24a to 24d) to be smaller than when the horizontal airflow mode is not selected.

(II) The rotational speed controller (94) controls the rotational speed of the indoor fan (31) to be higher than when the horizontal airflow mode is not selected.

(III) The airflow direction controller (93) sets any of the airflow direction adjusting flaps (51) to the airflow blocking position, and the rotational speed controller (94) sets the rotational speed of the indoor fan (31) to be higher than when the horizontal airflow mode is not selected.

These methods (I) to (III) correspond to the methods (I) to (III) described in the first embodiment. Detailed description of these methods (I) to (III) is therefore omitted.

As a result, the relatively warm air coming from the main outlet opening (24a to 24d) reaches the vicinity of the wall (502) of the indoor space (500) and flows down along the wall (502). The wall (502) of the indoor space (500) is reliably warmed by the air, and the temperature of the wall (502) of the indoor space (500) increases. The air which has reached the wall (502) blocks the cold air from entering the indoor space (500) from the wall (502). Consequently, the difference in temperature between a central portion and a peripheral portion (near the wall) of the indoor space (500) becomes small.

Note that the air may flows downward in the usual airflow mode. In the usual airflow mode, the airflow direction is horizontal, but the speed of the air in the usual airflow mode may be controlled to be slower than in the horizontal airflow mode.

<Example Application of Airflow in Heating Operation>

Example applications of the horizontal airflow mode in the heating operation of the second embodiment include the airflow rotation described in the first embodiment. That is, when the horizontal airflow mode is selected in the heating operation, the airflow rotation described in the first embodiment may be performed. Detailed description of the airflow rotation and the description of temperature distribution in the indoor space (500) will be omitted.

Airflow in cooling operation is the same as, or similar to, that of the first embodiment. The explanation thereof will thus be omitted.

—Advantages of Second Embodiment—

The indoor unit (10) of the second embodiment supplies the air to the indoor space (500) in the horizontal direction when the remote controller (201) receives the horizontal airflow mode in the heating operation. The horizontal airflow mode is selected by the person in the room when the person himself/herself feels that the indoor space (500) is in the so-called high load state. The relatively warm air can therefore reach the vicinity of the wall of the indoor space (500) from where cold air is likely to enter the indoor space (500). The relatively warm air blocks the cold air from coming into the indoor space (500) from near the wall. Entrance of cold air into the indoor space (500) from near the wall can therefore be avoided. Consequently, the difference in temperature between a central portion and a peripheral portion (near the wall) of the indoor space (500) becomes small.

Further, in the second embodiment, when the remote controller (201) receives the horizontal airflow mode in the heating operation, the speed of air coming from the main outlet opening (24a to 24d) is controlled to be higher than when the remote controller (201) does not receive the horizontal airflow mode (e.g., the indoor unit is in the usual airflow mode). Thus, the relatively warm air can reach the vicinity of the wall more easily. Entrance of cold air into the indoor space (500) from near the wall can be avoided more reliably.

Like the method (I) described above, reducing the total opening area of the main outlet openings (24a to 24d) can be one of example methods for increasing the speed of air. According to this method, the speed of air can be easily increased.

The method (I) can be carried out by the airflow direction adjusting flap (51) configured to be movable to the position where the flow of air is inhibited. This configuration allows the air to be supplied at a higher speed by reducing the total opening area of the main outlet openings (24a to 24d) without any other airflow inhibition mechanism (50) for inhibiting the flow of air provided independently of the airflow direction adjusting flap (51).

Like the method (II) described above, increasing the rotational speed of the indoor fan (31) can be one of example methods for increasing the speed of air. According to this method, as well, the speed of air can be easily increased.

The method (III) described above can be employed as one of example methods for increasing the speed of air. According to the method (III), the flow of air can be increased more reliably.

—First Variation of Second Embodiment—

The indoor unit (10) is not limited to the ceiling embedded type. The indoor unit (10) may be of a ceiling suspended type or of a wall hanging type. Whatever the type of the indoor unit (10) is, the direction of air coming from the main outlet opening (24a to 24d) may be suitably determined so that the air reaches the vicinity of the wall of the indoor space (500) when the horizontal airflow mode is selected in the heating operation. Thus, in the ceiling mounted type and the wall hanging type, the airflow direction controller (93) may control the airflow direction adjusting flap (51) such that the air coming from the main outlet opening (24a to 24d) is directed upward with respect to the horizontal direction (for example, such that the airflow direction adjusting flap (51) is angled 25° upward with respect to the horizontal direction) when the horizontal airflow mode is selected in the heating operation. For example, the air coming from the main outlet opening (24a to 24d) may be supplied upward with respect to the horizontal direction using the Coanda effect.

—Second Variation of Second Embodiment—

The angle of the airflow direction adjusting flap (51), while taking the horizontal airflow position, with respect to the horizontal direction may be finely adjusted as necessary, according to the distance from the location of the indoor unit (10) and the wall surface of the indoor space (500), so that the air coming from the main outlet opening (24a to 24d) can reach the vicinity of the wall of the indoor space (500). The distance from the location of the indoor unit (10) to the wall surface of the indoor space (500) may be input to the indoor controller (90) at the installation of the indoor unit (10) in the indoor space (500) by a worker who installs the indoor unit (10). Alternatively, a sensor for detecting the distance may be attached to the indoor unit (10) in advance.

—Third Variation of Second Embodiment—

The number of main outlet openings (24a to 24d) is not limited to four. For example, one or two main outlet openings may be provided.

—Fourth Variation of Second Embodiment—

The indoor unit (10) may have a shutter for closing the main outlet opening (24a to 24d) in addition to the airflow direction adjusting flaps (51) as an airflow inhibition mechanism. Preferably, in this case, the airflow inhibition mechanism is provided to correspond to each of the main outlet openings (24a to 24d). For example, the airflow inhibition mechanism may be configured as an open/close shutter.

—Fifth Variation of Second Embodiment—

It is not essential to carry out the control to increase the speed of air. In carrying out the control to increase the speed of air, methods except the methods (I) to (III) described above may be employed.

—Sixth Variation of Second Embodiment—

The indoor unit (10) may be configured as a combination of an aspect of the first embodiment, that is, automatically detecting the load of the indoor space and taking the horizontal airflow position, and an aspect of the second embodiment, that is, taking the horizontal airflow position in accordance with an instruction from a person in the room. In this case, the indoor unit (10) may have an automatic detection mode detecting automatically the load of the indoor space (500) and taking the horizontal airflow mode, and a manual mode not detecting automatically the load of the indoor space (500) and taking the horizontal airflow mode in accordance with the instruction from the person in the room.

Preferably, the indoor unit (10) may be configured to be switchable between the automatic detection mode and the manual mode by the person in the room via the remote controller (201). The indoor unit (10) can employ the aspect of the first embodiment when the automatic detection mode is selected, and employ the aspect of the second embodiment when the manual mode is selected.

—Seventh Variation of Second Embodiment—

If the method (I) or (III) is employed as the control to increase the speed of air, the airflow direction adjusting flap (51) may close the corresponding main outlet opening (24a to 24d) completely, instead of taking the airflow blocking position in FIG. 8.

Note that variations of the airflow rotation are the same as, or similar to, those described in the first embodiment.

INDUSTRIAL APPLICABILITY

As can be seen from the foregoing description, the present invention is useful as an indoor unit of an air-conditioning device which supplies air to an indoor space.

DESCRIPTION OF REFERENCE CHARACTERS

10 Indoor Unit
20 Casing (Indoor Casing)
24a to 24d Main Outlet Opening (Outlet Opening)
50 Airflow Inhibition Mechanism
51 Airflow Direction Adjusting Flap
81 Temperature Sensor (Temperature Detector)
91 Load Detector
92 Motor Controller (Controller)
201 Remote Controller (Receiver)
500 Indoor Space

The invention claimed is:

1. An indoor unit of an air-conditioning device which supplies air to an indoor space, the indoor unit comprising:
    an indoor casing provided with at least one outlet opening and at least one inlet opening;
    an airflow direction adjusting flap which is provided at the outlet opening and changes a direction of air coming from the outlet opening in a vertical direction;
    a load detector which detects a load of the indoor space based on a suction temperature detected by a suction temperature sensor, the suction temperature sensor being positioned inside the indoor casing such that it detects the temperature of air sucked into the indoor casing from the at least one inlet opening;
    an indoor fan positioned in the indoor unit; and
    a controller configured to
        control the airflow direction adjusting flap based on the detected load such that, when the load of the indoor space is higher than a predetermined value in a heating operation, the airflow direction adjusting flap is moved such that the direction of the air coming from the outlet opening is in a horizontal direction or directed upward from the horizontal direction, wherein
    the airflow direction adjusting flap also functions as an airflow inhibition mechanism which is provided at the outlet opening and is configured to inhibit flow of air, the airflow direction adjusting flap being configured to be movable to an inhibition position where the flow of air is inhibited, when the load of the indoor space is higher than the predetermined value in the heating operation, the controller controls the airflow direction adjusting flap, which also functions as the airflow inhibition mechanism, such that a total opening area of the at least one outlet opening is smaller than when the load of the indoor space is lower than the predetermined value in the heating operation, and sets a speed of the air coming from the outlet opening at a higher speed than when the load of the indoor space is lower than the predetermined value in the heating operation, when the airflow direction adjusting flap takes the inhibition position, a gap is formed between an edge of the airflow direction adjusting flap and an edge of the outlet openings, and the controller is further configured to control the indoor fan such that the rotational speed of the indoor fan is constant.

2. The indoor unit of an air-conditioning device according to claim 1, wherein the indoor unit has a plurality of air outlets and airflow direction adjusting flaps.

* * * * *